US012668120B2

(12) United States Patent
Ono

(10) Patent No.: US 12,668,120 B2
(45) Date of Patent: Jun. 30, 2026

(54) WORK MACHINE

(71) Applicant: Kubota Corporation, Osaka (JP)

(72) Inventor: Kohei Ono, Sakai (JP)

(73) Assignee: Kubota Corporation, Osaka (JP)

( * ) Notice: Subject to any disclaimer, the term of this patent is extended or adjusted under 35 U.S.C. 154(b) by 296 days.

(21) Appl. No.: 18/389,024

(22) Filed: Nov. 13, 2023

(65) Prior Publication Data

US 2024/0157782 A1 May 16, 2024

(30) Foreign Application Priority Data

Nov. 14, 2022 (JP) ................................. 2022-181870

(51) Int. Cl.
B60K 13/02 (2006.01)
(52) U.S. Cl.
CPC ......... B60K 13/02 (2013.01); *B60Y 2200/223* (2013.01)
(58) Field of Classification Search
CPC .. B60K 13/02; B60K 13/06; B60Y 2200/223; F02M 35/10268
See application file for complete search history.

(56) References Cited

U.S. PATENT DOCUMENTS

2008/0277951 A1* 11/2008 Rathje ..................... B60R 21/34
293/115
2016/0193912 A1 7/2016 Minoura et al.
2018/0226702 A1* 8/2018 Inoue ...................... B60L 50/64

FOREIGN PATENT DOCUMENTS

JP 2008536743 A 9/2008
JP 201668690 A 5/2016
JP 2016068690 A * 5/2016
JP 2016124428 A 7/2016
WO WO-2015025088 A1 * 2/2015 ........... F02M 35/088

* cited by examiner

*Primary Examiner* — Lori Wu
(74) *Attorney, Agent, or Firm* — The Webb Law Firm

(57) ABSTRACT

A work machine includes (i) an air cleaner being on the inner side of a motive section relative to a radiator and having an air intake port facing an air intake section of a hood and (ii) an air intake state switcher switchable between an outside air introducing state and a hot air introducing state, wherein in the outside air introducing state, the air intake state switcher causes outside air to be introduced through the air intake port, and in the hot air introducing state, the air intake state switcher causes air to be introduced from a high temperature area hotter than outside air through the air intake port.

8 Claims, 5 Drawing Sheets

WORK MACHINE

CROSS-REFERENCE TO RELATED APPLICATION

This application claims priority to Japanese Patent Application No. 2022-181870 filed Nov. 14, 2022, the disclosure of which is hereby incorporated by reference in its entirety.

BACKGROUND OF THE INVENTION

Field of the Invention

The present invention relates to a work machine including components such as an engine and an air cleaner in its motive section.

Description of Related Art

An example of the above work machine is a riding-type mower, which may conventionally include a motor section at a back portion of the body, and a radiator at a front portion of the motive section, the mower being configured to take in outside air through an air intake section at a front portion of the hood, the mower further including an air cleaner disposed backward of the radiator, that is, on the inner side of the motive section relative to the radiator, and having an air intake port facing the air intake section (see JP 2016-124428 A).

The above conventional mower operates normally when outside air is hot. However, when, for instance, the mower is used in a cold place, and outside air is cold, the air cleaner takes in cold outside air through the air intake section to be supplied to the engine as combustion air. This may prevent the engine from starting normally, resulting in decreased convenience.

The above circumstances have led to a demand for a work machine always capable of starting its engine normally regardless of the outside air temperature.

SUMMARY OF THE INVENTION

A work machine according to the present invention includes: a hood; a motive section under the hood; and an air intake state switcher, the motive section including: an engine; an air cleaner configured to supply combustion air to the engine; a radiator configured to cool the engine; and a cooling fan configured to blow cooling air toward the radiator, the radiator facing an air intake section of the hood, the air cleaner being on an inner side of the motive section relative to the radiator and having an air intake port facing the air intake section, the air intake state switcher being switchable between an outside air introducing state and a hot air introducing state, wherein in the outside air introducing state, the air intake state switcher causes outside air to be introduced through the air intake port, and in the hot air introducing state, the air intake state switcher causes air to be introduced from a high temperature area hotter than outside air through the air intake port.

The work machine is configured such that the air intake state switcher is switched into the outside air introducing state when outside air is hot. In this state, the air intake port of the air cleaner faces the air intake section of the hood, allowing the air cleaner to take in outside air. This in turn allows hot air to be supplied to the engine, and thereby allows the engine to start normally. If the air intake state switcher were in the hot air introducing state when outside air is hot, the air taken in would be heated to have a decreased density, possibly decreasing the engine output.

The work machine is also configured such that the air intake state switcher is switched into the hot air introducing state when outside air is cold. In this state, the air cleaner does not take in outside air through the air intake section, but introduces air from a high temperature area through the air intake port. If the air cleaner took in outside air and supplied it to the engine when outside air is cold, the engine might not start normally. In view of that, the air cleaner is configured to take in heated air when outside air is cold. This allows heated air to be supplied to the engine, allowing the engine to start normally.

The work machine is therefore always capable of starting its engine normally regardless of the outside air temperature.

The work machine may preferably be further configured such that the air intake state switcher includes a cover switchable between an open state, in which the cover opens a space upstream of the air intake port in a direction in which the air cleaner takes in air, and a path forming state, in which the cover covers the upstream space and forms a guide path for guiding air from around the radiator as the high temperature area to the air intake port.

With the above configuration, simply switching the state of the cover switches the air intake state switcher between the outside air introducing state and the hot air introducing state. The work machine is thus always capable of starting its engine normally without a complicated arrangement.

The work machine may preferably further include: a manual fastener configured to fix the cover in each of the open state and the path forming state.

The above configuration allows the cover to be manually fastened to be fixed. This means that the cover is reliably fixable with a simple arrangement for appropriate air intake.

The work machine may preferably further include: an operation mechanism configured to switch the cover between the open state and the path forming state.

The above configuration allows the state of the cover to be switched with use of the operation mechanism readily as compared to the case of switching the state manually.

The work machine may preferably be further configured such that the cover is held in a direction crossing the air intake direction and slidable to be switched between the open state and the path forming state.

The above configuration allows the cover to be slid to be switched between the open state and the path forming state efficiently as compared to the case of, for example, taking the trouble to detach and reattach the cover.

The work machine may preferably be further configured such that the air intake state switcher causes air to be introduced from around the engine as the high temperature area through the air intake port.

The above configuration uses hot air around the engine, and thereby utilizes heat from the engine to heat air that the air cleaner takes in.

The work machine may preferably be further configured such that the cover includes: a horizontal and flat first member; a vertical and flat second member; and an air intake cover section extending obliquely from an upper portion of the second member to a front portion of the first member in a side view, and the first and second members and the air intake cover section define the guide path.

The work machine may preferably be further configured such that the cover further includes: an air intake pipe through hole in a portion of the air intake cover section which portion corresponds to the air intake port; and a switchable cover section switchable between a closed state and an open state, wherein in the closed state, the switchable cover section is fixed to a first position on the air intake cover section which first position corresponds to the air intake pipe through hole to block the air intake pipe through hole, and in the open state, the switchable cover section is fixed to a second position on the air intake cover section which second position is different from the first position to open the air intake pipe through hole.

DESCRIPTION OF THE INVENTION

Figure 1:
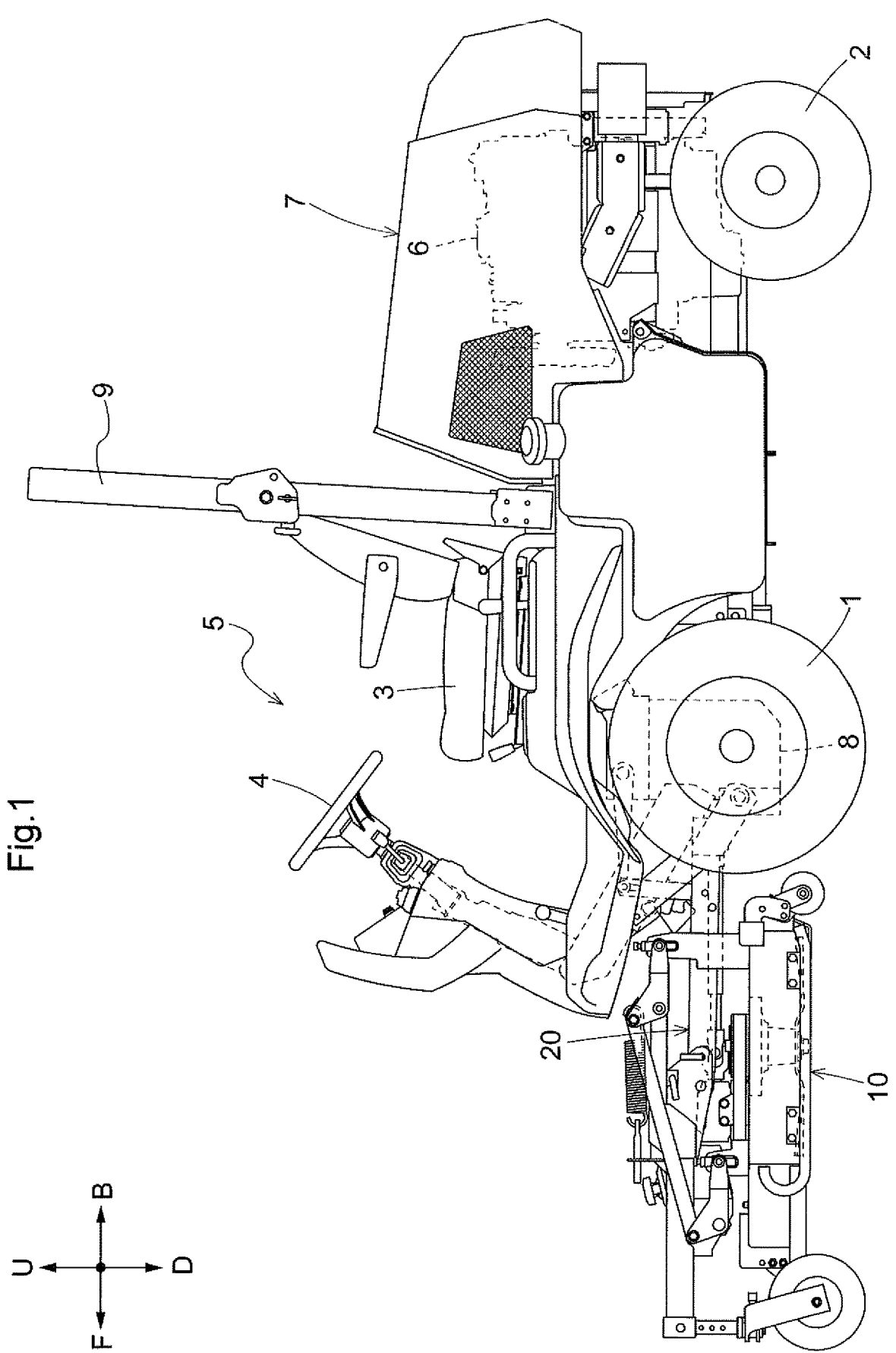
FIG. 1 is a side view of a work machine.

The description below deals with an embodiment of the present invention with reference to drawings. Unless otherwise specified, the description below uses terms such as "front" and "forward" to refer to the side indicated with arrow F in the drawings, terms such as "back" and "backward" to refer to the side indicated with arrow B in the drawings, terms such as "upward" and "above" to refer to the side indicated with arrow U in the drawings, and terms such as "downward" and "below" to refer to the side indicated with arrow D in the drawings.

FIG. 1 illustrates a front-mount riding-type mower as an example of the work machine according to the present invention. The mower includes a body, a pair of left and right drivable front wheels 1 provided for the body, a pair of left and right turnable rear wheels 2 provided for the body, and a mower device 10 forward of the body.

The mower includes at a front portion of the body, a driver's seat 3, a steering wheel 4 for use to turn the rear wheels 2, and a riding-type driver section 5 containing the driver's seat 3 and the steering wheel 4. The mower includes at a back portion of the body an engine 6 and a motive section 7 containing the engine 6. The mower includes between the driver section 5 and the motive section 7 a roll-over protective structure (ROPS) 9 substantially the shape of an inverted U in a front view. The mower includes under the driver section 5 a transmission case 8 containing a power transmission mechanism (not illustrated in the drawings) configured to receive motive power from the engine 6 and output the motive power to the front wheels 1 and the mower device 10. The mower includes a lifting and lowering link 20 holding the mower device 10 and configured to lift the mower device 10 into a non-working state and lower the mower device into a working state.

Motive Section

Figure 2:
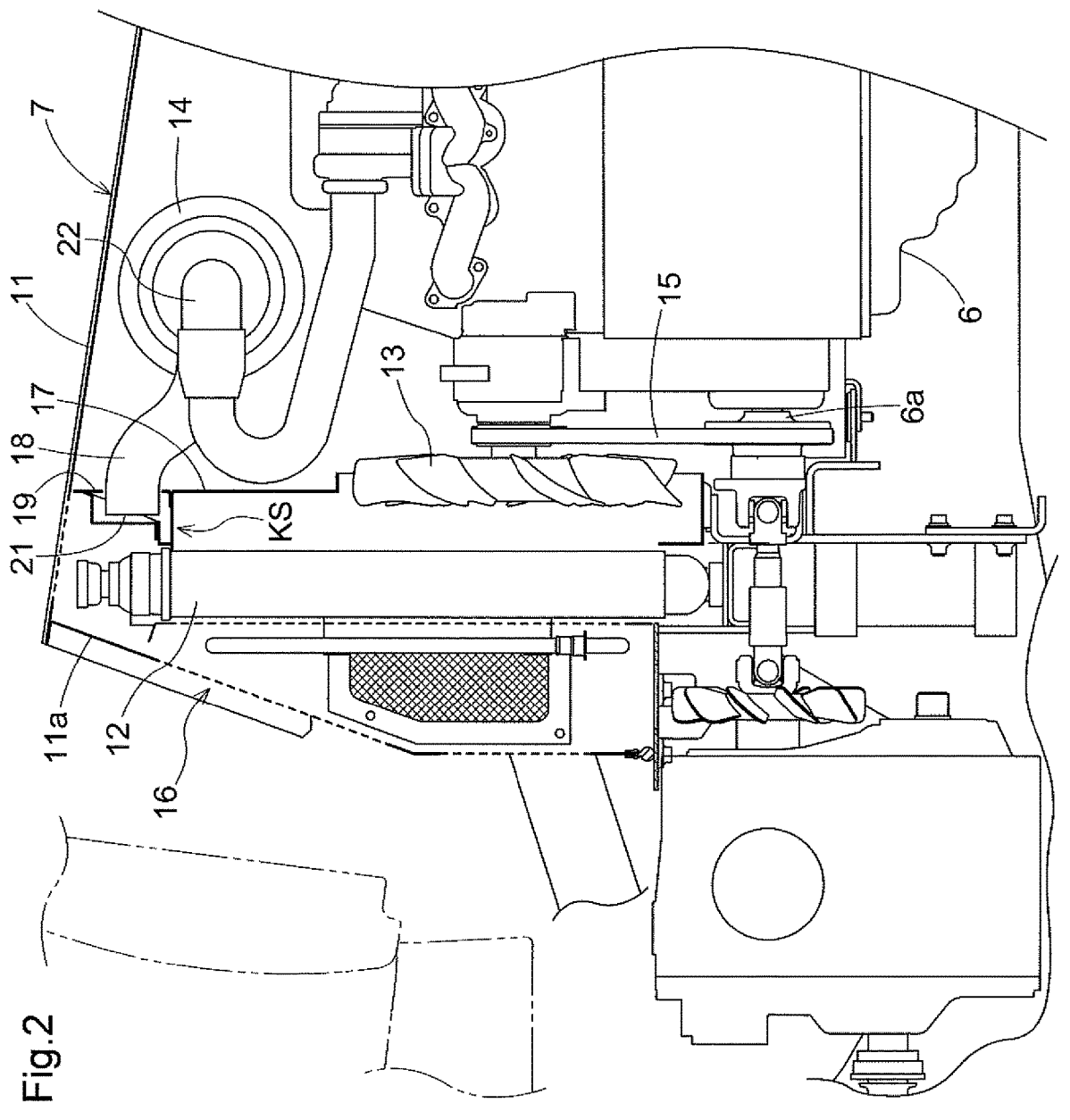
FIG. 2 is a cross-sectional side view of a motive section.
Figure 3:
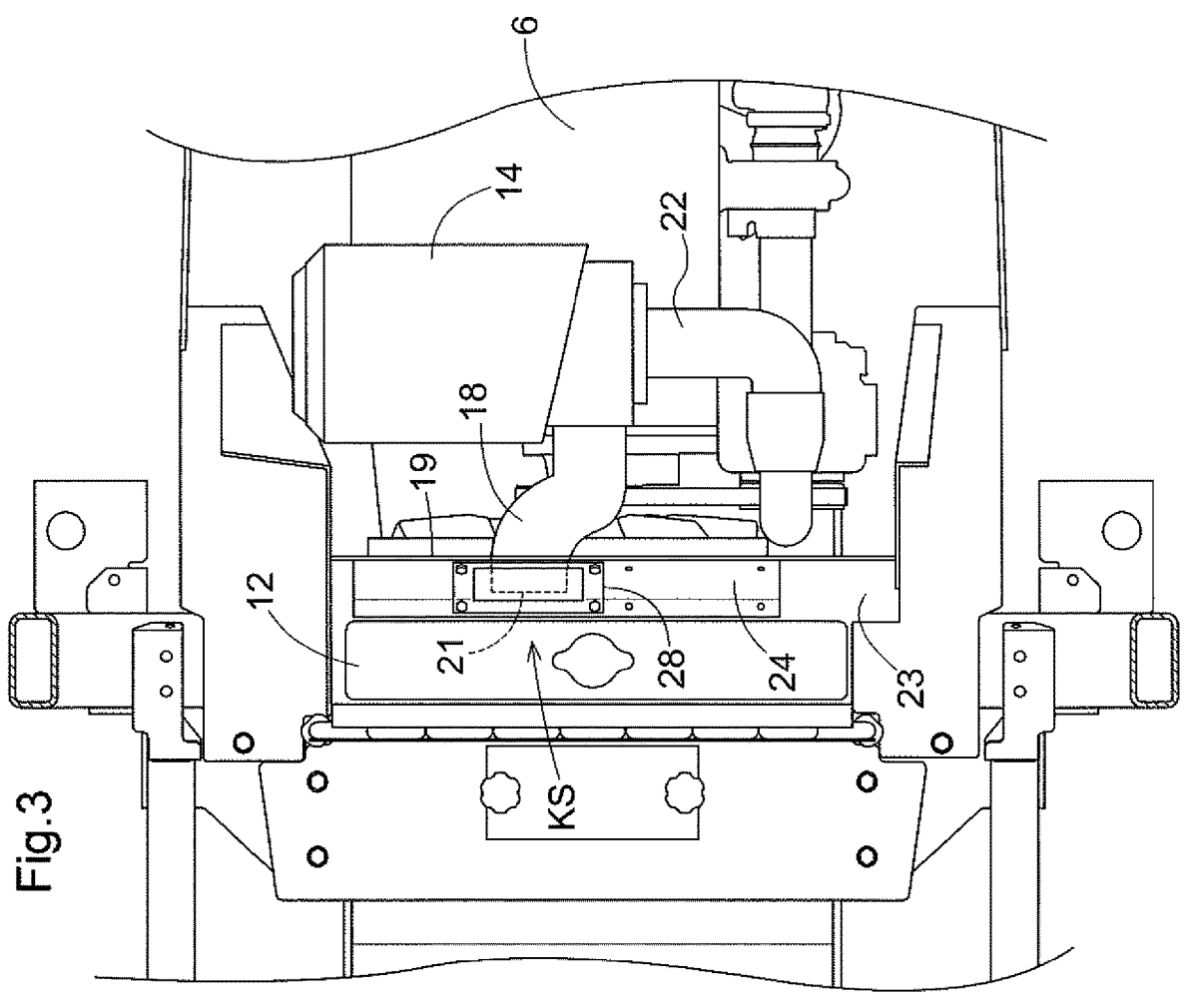
FIG. 3 is a cross-sectional plan view of a motive section.

As illustrated in FIGS. 2 and 3, the mower includes a hood 11 configured to cover the motive section 7. The motive section 7 includes under the hood 11 an engine 6, a radiator 12 for cooling the engine 6, a cooling fan 13 drivable by the engine 6, and an air cleaner 14 configured to supply combustion air to the engine 6. The motive section 7 is provided with an exhaust gas cleaning device (not illustrated in the drawings) disposed backward of the motive section 7 and configured to clean exhaust gas from the engine 6.

The radiator 12 is forward of the engine 6, and is so oriented vertically as to have a cooling face at a front portion. The cooling fan 13 is disposed between the engine 6 and the radiator 12, and is drivable to rotate with use of a power transmission belt 15 around the output shaft 6a of the engine 6 to blow cooling air backward.

The hood 11 includes a front wall 11a fronting on or facing the cooling face of the radiator 12. The front wall 11a has an air intake opening 16 as an air intake section provided with a dust-tight net. The motive section 7 includes between the radiator 12 and the cooling fan 13 a fan shroud 17 surrounding the space between the radiator 12 and the cooling fan 13 and configured to guide air through the air intake opening 16 and the radiator 12 as the cooling fan 13 takes in air.

The air cleaner 14 includes a substantially cylindrical housing. The air cleaner 14 is disposed over the engine 6 and so oriented horizontally as to have its cylindrical axis along the lateral direction of the body. The air cleaner 14 is held by a bracket extending from the fan shroud 17.

The air cleaner 14 is provided with an air intake pipe 18 extending obliquely upward from the air cleaner 14 and curved substantially in an S shape in a plan view. The motive section 7 includes a vertical wall 19 disposed as a partition over the fan shroud 17. The air intake pipe 18 extends through the vertical wall 19 from the front side to the back side. The air cleaner 14 has an air intake port 21 toward the space on the side of the radiator 12. This means that the air cleaner 14 is on the inner side of the motive section 7 relative to the radiator 12, in other words, backward of the radiator 12. The air intake port 21 fronts on or faces the air intake section of the hood 11 (that is, the air intake opening 16). The air cleaner 14 is provided with a discharge pipe 22 extending downward, curved substantially in a U shape in a side view, and connected to an air intake manifold of the engine 6.

The motive section 7 includes an air intake state switcher KS switchable between an outside air introducing state and a hot air introducing state. In the outside air introducing state, the air intake state switcher KS causes outside air to be introduced through the air intake port 21. In the hot air introducing state, the air intake state switcher KS causes air to be introduced from a high temperature area hotter than outside air through the air intake port 21.

The air intake state switcher KS includes a cover C switchable between an open state and a path forming state. In the open state, the cover C opens a space upstream of the air intake port 21 in the air intake direction. In the path forming state, the cover C blocks the upstream space and forms a guide path L for guiding air from around the radiator 12 as the high temperature area to the air intake port 21.

Figure 4:
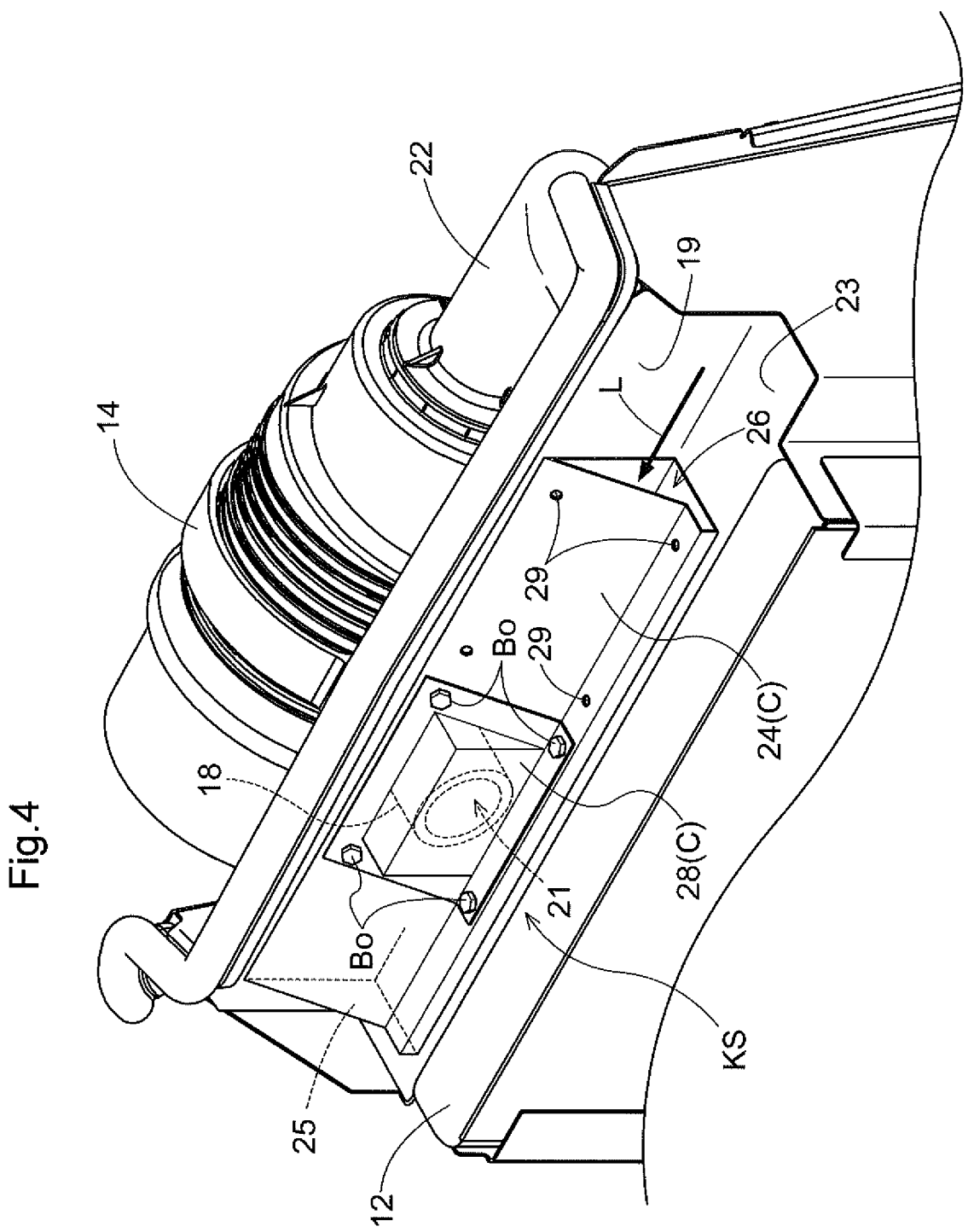
FIG. 4 is a perspective view of an air intake state switcher in a hot air introducing state.

As illustrated in FIG. 4, the cover C includes an air intake cover section 24 configured to form a guide path L together with an top wall 23 of the fan shroud 17 and the vertical wall 19. The air intake cover section 24 extends along substantially the entire width of the fan shroud 17, and in a side view, extends obliquely from an upper portion of the vertical wall 19 to a front portion of the top wall 23. In other words, the cover C includes (i) a horizontal and flat top wall 23 (which corresponds to the "first member"), (ii) a flat vertical wall 19 (which corresponds to the "second member"), and (iii) a plate-shaped air intake cover section 24 extending obliquely from an upper portion of the vertical wall 19 to a front portion of the top wall 23 in a side view. The air intake cover section 24 thus forms a guide path L together with the top wall 23 and the vertical wall 19.

The guide path L is in the shape of a laterally extending pipe, and has a right end blocked by a blocking member 25 and a left end with an opening 26. The air intake cover section 24 has an air intake pipe through hole 27 disposed at a position corresponding to the air intake pipe 18 and configured to receive the air intake pipe 18 therethrough. In other words, the cover C has an air intake pipe through hole 27 in a portion of the air intake cover section 24 which portion corresponds to the air intake port 21, that is, which portion is upstream of the air intake port 21 in the air intake direction.

The cover C includes a switchable cover section 28 switchable between a closed state and an open state. In the closed state, the switchable cover section 28 is fixed to that portion of the air intake cover section 24 which corresponds to the air intake pipe through hole 27 to block the air intake pipe through hole 27. In the open state, the switchable cover section 28 is fixed to a position different from, specifically to the left of, the above portion for the closed state. In other words, the cover C includes a switchable cover section 28 switchable between a closed state and an open state, wherein in the closed state, the switchable cover section 28 is provided for the air intake cover section 24 and fixed to a first position to block the air intake pipe through hole 27, and in the open state, the switchable cover section 28 is fixed to a second position different from the first position to open the air intake pipe through hole 27. The portion corresponding to the air intake pipe through hole 27 is a portion of the air intake cover section 24 which portion surrounds the air intake pipe through hole 27. Simply moving the switchable cover section 28 between the two positions for attachment switches the cover C between the open state and the path forming state, facilitating the operation of the air intake state switcher KS.

The switchable cover section 28 is fixable to the air intake cover section 24 with use of bolts Bo as a manual fastener at respective peripheral positions. The air intake cover section 24 has bolt through holes 29 in an area that will surround the switchable cover section 28 in the closed state and other bolt through holes 29 in an area that will surround the switchable cover section 28 in the open state. The bolts Bo are each insertable through a bolt through hole 29 to fasten the switchable cover section 28 to the air intake cover section 24. Some of the bolt through holes 29 are usable for both the closed and open states.

Fixing the switchable cover section 28 into the closed state blocks the air intake pipe through hole 27 in the air intake cover section 24, The switchable cover section 28 in the closed state covers a space upstream of the air intake port 21 of the air cleaner 14 in the air intake direction. In other words, the air intake cover section 24 covers a space forward of the air intake port 21. The air cleaner 14 taking in air through the air intake port 21 introduces air through the opening 26, which is at the left end of the guide path L.

The air cleaner 14 takes in, through the opening 26, air that is around the radiator 12 and that is hotter than outside air due to the radiator 12 as heated by circulation of cooling water for the engine 6. In this state, the cover C is in the path forming state, and the air intake state switcher KS is in the hot air introducing state (see FIG. 4).

The air cleaner 14 is capable of taking in air hotter than outside air. As described above, the vertical wall 19, the air intake cover section 24, and the top wall 23 form a guide path L for guiding air from around the radiator 12 as the high temperature area to the air intake port 21.

Fixing the switchable cover section 28 into the open state opens the air intake pipe through hole 27 in the air intake cover section 24, opening a space upstream of the air intake port 21 in the air intake direction. In other words, the air intake cover section 24 does not cover a space forward of the air intake port 21. The air cleaner 14 is, in this state, capable of taking in outside air through the air intake opening 16 in the hood 11 and the air intake port 21. In this state, the cover C is in the open state, and the air intake state switcher KS is in the outside air introducing state (see FIG. 5).

Figure 5:
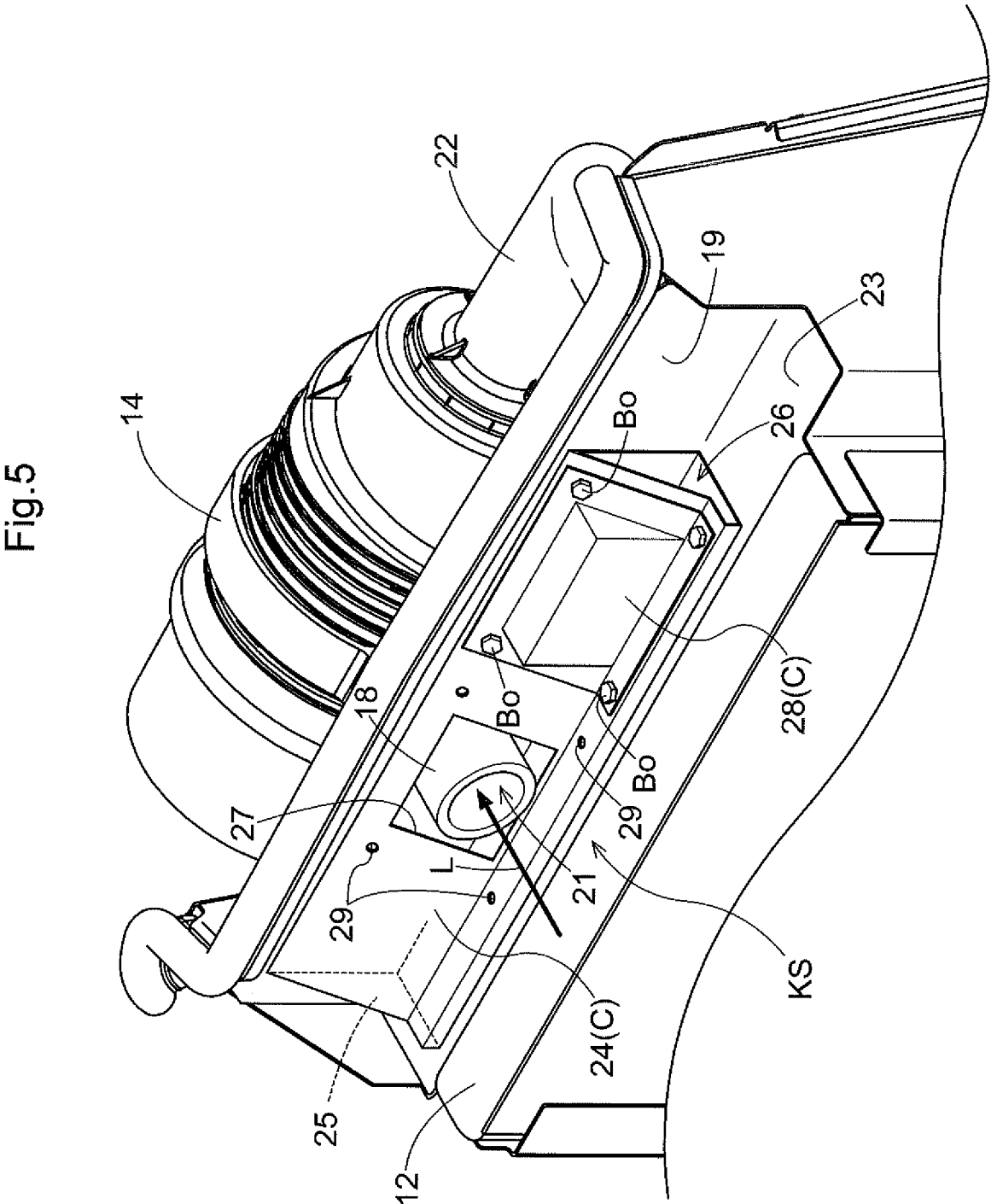
FIG. 5 is a perspective view of an air intake state switcher in an outside air introducing state.

When outside air is cold, switching the cover C into the path forming state and the air intake state switcher KS into the hot air introducing state as illustrated in FIG. 4 causes the air cleaner 14 to take in air hotter than outside air for a better operation of the engine 6. When outside air is hot, switching the cover C into the open state and the air intake state switcher KS into the outside air introducing state as illustrated in FIG. 5 prevents the air cleaner 14 from taking in air hotter than necessary to prevent the engine 6 from suffering from an output decrease.

Alternative Embodiments (1) The embodiment described above is configured such that the switchable cover section 28 of the cover C is fixable into either of the open state and the path forming state with use of bolts Bo as a manual fastener. The embodiment may be altered as follows:

(a) The switchable cover section 28 may be held by the air intake cover section 24 or the fan shroud 17 and slidable in a direction crossing the air intake direction, for example laterally, to be switched between the open state and the path forming state.

(b) The embodiment may further include an operation mechanism configured to switch the switchable cover section 28 between the open state and the path forming state. The operation mechanism may be, for example, an electric or hydraulic actuator, or may be manually operable.

(2) The embodiment described above is configured such that the air cleaner 14 takes in air from around the radiator 12 as a high temperature area hotter than outside air. The air cleaner 14 may alternatively take in air from around the engine 6 as the high temperature area through the air intake port 21.

The high temperature area is not necessarily an area around the radiator 12 or the engine 6, and may alternatively be any other area hotter than outside air.

(3) The embodiment described above is configured such that the air intake state switcher KS includes a cover C switchable between the open state and the path forming state. The embodiment may alternatively include a flow path switcher device connected to the air intake port 21 and including a switcher valve configured to switch a flow path between (i) a state in which the flow path introduces outside air through the air intake port 21 and (ii) a state in which the flow path introduces air from a high temperature area through the air intake port 21.

(4) The embodiment described above is configured such that the air intake state switcher KS is manually switchable between the outside air introducing state and the hot air introducing state. The air intake state switcher KS may alternatively include an automatic controller mechanism configured to, for instance, detect the temperature of outside air and (i) keep the air intake state switcher KS in the outside air introducing state while the outside air temperature is not lower than a predetermined value and (ii) automatically switch the air intake state switcher KS into the hot air introducing state in response to the outside air temperature dropping below the predetermined value.

(5) The embodiment described above is a front-mount riding-type mower as an example of the work machine. The present invention is, however, not limited to such an embodiment, and may alternatively be embodied as any of other work machines such as a mid-mount riding-type mower and a tractor.

The present invention is applicable to a work machine including components such as an engine and an air cleaner in its motive section.

The invention claimed is:

1. A work machine, comprising:
a hood;
a motive section under the hood;
an air intake state switcher; and
a manual fastener,
wherein:
the motive section comprises:
  an engine;
  an air cleaner configured to supply combustion air to the engine;
  a radiator configured to cool the engine; and
  a cooling fan configured to blow cooling air toward the radiator,
the radiator faces an air intake section of the hood,
the air cleaner is on an inner side of the motive section relative to the radiator and has an air intake port facing the air intake section,
the air intake state switcher is switchable between an outside air introducing state and a hot air introducing state, wherein in the outside air introducing state, the air intake state switcher causes outside air to be introduced through the air intake port, and in the hot air introducing state, the air intake state switcher causes air to be introduced from a high temperature area hotter than outside air through the air intake port,
the air intake state switcher includes a cover switchable between an open state, in which the cover opens a space upstream of the air intake port in a direction in which the air cleaner takes in air, and a path forming state, in which the cover covers the upstream space and forms a guide path for guiding air from around the radiator as the high temperature area to the air intake port, and
the manual fastener is configured to fix the cover in each of the open state and the path forming state.

2. The work machine according to claim 1, further comprising:
an operation mechanism configured to switch the cover between the open state and the path forming state.

3. The work machine according to claim 1, wherein:
the air intake state switcher causes air to be introduced from around the engine as the high temperature area through the air intake port.

4. The work machine according to claim 1, wherein:
the cover is held in a direction crossing the air intake direction and slidable to be switched between the open state and the path forming state.

5. A work machine, comprising:
a hood;
a motive section under the hood; and
an air intake state switcher,
wherein:
the motive section comprises:
  an engine;
  an air cleaner configured to supply combustion air to the engine;

a radiator configured to cool the engine; and
  a cooling fan configured to blow cooling air toward the radiator,
the radiator faces an air intake section of the hood,
the air cleaner is on an inner side of the motive section relative to the radiator and has an air intake port facing the air intake section,
the air intake state switcher is switchable between an outside air introducing state and a hot air introducing state, wherein in the outside air introducing state, the air intake state switcher causes outside air to be introduced through the air intake port, and in the hot air introducing state, the air intake state switcher causes air to be introduced from a high temperature area hotter than outside air through the air intake port,
the air intake state switcher includes a cover switchable between an open state, in which the cover opens a space upstream of the air intake port in a direction in which the air cleaner takes in air, and a path forming state, in which the cover covers the upstream space and forms a guide path for guiding air from around the radiator as the high temperature area to the air intake port, and
the cover is held in a direction crossing the air intake direction and slidable to be switched between the open state and the path forming state.

6. A work machine, comprising:
a hood;
a motive section under the hood; and
an air intake state switcher,
wherein:
the motive section comprises:
  an engine;
  an air cleaner configured to supply combustion air to the engine;
  a radiator configured to cool the engine; and
  a cooling fan configured to blow cooling air toward the radiator,
the radiator faces an air intake section of the hood,
the air cleaner is on an inner side of the motive section relative to the radiator and has an air intake port facing the air intake section,
the air intake state switcher is switchable between an outside air introducing state and a hot air introducing state, wherein in the outside air introducing state, the air intake state switcher causes outside air to be introduced through the air intake port, and in the hot air introducing state, the air intake state switcher causes air to be introduced from a high temperature area hotter than outside air through the air intake port,
the air intake state switcher includes a cover switchable between an open state, in which the cover opens a space upstream of the air intake port in a direction in which the air cleaner takes in air, and a path forming state, in which the cover covers the upstream space and forms a guide path for guiding air from around the radiator as the high temperature area to the air intake port, and
the cover comprises:
  a horizontal and flat first member;
  a vertical and flat second member; and
  an air intake cover section extending obliquely from an upper portion of the second member to a front portion of the first member in a side view, and
the first and second members and the air intake cover section define the guide path.

7. The work machine according to claim 6, wherein:
the cover further comprises:

an air intake pipe through hole in a portion of the air intake cover section which portion corresponds to the air intake port; and a switchable cover section switchable between a closed state and an open state, wherein in the closed state, the switchable cover section is fixed to a first position on the air intake cover section which first position corresponds to the air intake pipe through hole to block the air intake pipe through hole, and in the open state, the switchable cover section is fixed to a second position on the air intake cover section which second position is different from the first position to open the air intake pipe through hole.

8. The work machine according to claim 6, wherein:

the cover is held in a direction crossing the air intake direction and slidable to be switched between the open state and the path forming state.

\* \* \* \* \*